United States Patent
Suzuki

(10) Patent No.: US 10,162,587 B2
(45) Date of Patent: Dec. 25, 2018

(54) NON-TRANSITORY COMPUTER-READABLE RECORDING MEDIUM FOR INFORMATION PROCESSING TERMINAL

(71) Applicant: BROTHER KOGYO KABUSHIKI KAISHA, Nagoya-shi, Aichi-ken (JP)

(72) Inventor: Hiroaki Suzuki, Aichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/653,752

(22) Filed: Jul. 19, 2017

(65) Prior Publication Data

US 2018/0032294 A1    Feb. 1, 2018

(30) Foreign Application Priority Data

Jul. 26, 2016    (JP) .................. 2016-146644

(51) Int. Cl.
*G06F 3/12*    (2006.01)
*H04L 12/26*    (2006.01)
*H04N 1/00*    (2006.01)

(52) U.S. Cl.
CPC .......... *G06F 3/1259* (2013.01); *G06F 3/1221* (2013.01); *G06F 3/1229* (2013.01); *G06F 3/1285* (2013.01); *H04L 43/0817* (2013.01); *H04N 1/00885* (2013.01); *G06F 3/12* (2013.01); *H04L 43/12* (2013.01)

(58) Field of Classification Search
USPC ........ 358/1.1–3.29, 504, 404, 406, 434–437; 396/129, 301, 303; 399/37, 38, 69, 70, 399/85–91
See application file for complete search history.

(56) References Cited

U.S. PATENT DOCUMENTS

| | | | | |
|---|---|---|---|---|
| 2008/0007771 A1* | 1/2008 | Kanamori | ............ | B41J 2/17566 358/1.15 |
| 2011/0249285 A1* | 10/2011 | Kobayashi | ............ | G06F 3/1221 358/1.13 |
| 2014/0201549 A1* | 7/2014 | Nagasawa | ............. | G06F 1/3215 713/320 |

FOREIGN PATENT DOCUMENTS

| | | | |
|---|---|---|---|
| JP | 2006-76147 A | | 3/2006 |
| JP | 2006076147 | * | 3/2006 |

* cited by examiner

*Primary Examiner* — Marcellus Augustin
(74) *Attorney, Agent, or Firm* — Merchant & Gould P.C.

(57) ABSTRACT

A non-transitory computer-readable recording medium storing computer-readable instructions which causes an information processing terminal to transmit first request information requesting an image processing apparatus to transmit first information, receive the first information, as a response to the first request information, from the image processing apparatus, determine whether a set value of the received first information is the first value or the second value. When the first information is set to the first value, the instructions further cause the information processing terminal to transmit second request information requesting the image processing apparatus to transmit the second information, and receive the second information, as a response to the second request information, from the image processing apparatus. When the first information is set to the second value, the instructions do not cause the information processing terminal to transmit the second request information and to receive the second information.

17 Claims, 6 Drawing Sheets

NON-TRANSITORY COMPUTER-READABLE RECORDING MEDIUM FOR INFORMATION PROCESSING TERMINAL

CROSS-REFERENCE TO RELATED APPLICATIONS

This application claims priority under 35 U.S.C. § 119 from Japanese Patent Application No. 2016-146644 filed on Jul. 26, 2016. The entire subject matter of the application is incorporated herein by reference.

BACKGROUND

Technical Field

The present disclosures relate to an information processing terminal configured to display a status represented by status information received from an image processing apparatus, and specifically a non-transitory computer-readable recording medium for the information processing terminal containing instructions which, when executed by a controller, cause the information processing terminal to display a status represented by status information received from an image processing apparatus.

Related Art

Conventionally, a system configured to check the status of a peripheral device has been developed. For example, in a system having a host device and a peripheral device, the host device transmits a request for status information to the peripheral device, and the peripheral device transmits the status information to the host device in response to the request. Then, the host device displays the status of the peripheral device represented by the received status information.

SUMMARY

In the conventional system as described above, if the peripheral device is operable in a power-save mode (i.e., a sleep state), transmission of the status information may be stopped until the operation mode is switched back from the power-save mode to an active mode. In such a configuration, the host device cannot obtain the status information of the peripheral device until the operation mode of the peripheral device is switched from the power-save mode to the active mode (i.e., a ready state). If a recovery time is set, the operation mode of the peripheral device is not switched from the power-save mode to the normal mode until the recovery time. On the other hand, in such a system, the peripheral device needs to store information regarding the host device to which the recovery time is notified, or broadcast the recovery time to a communication network. Therefore, according to the conventional system as described above, excessive load is applied to the peripheral device and/or the communication network.

According to aspects of the disclosures, there is provided a non-transitory computer-readable recording medium storing computer-readable instructions for an information processing terminal having a communication interface and a controller. The computer-readable instructions, when executed by the controller, cause the information processing terminal to repeatedly, at every particular time interval, perform an information acquiring process of acquiring, from an image processing apparatus having image processing hardware configured to process image data, status information representing a status of the image processing apparatus. The status information includes at least one of first information and second information, the first information being set to a first value when the image processing hardware is in an active state where an electrical power is supplied to the image processing hardware, the first information being set to a second value when the image processing hardware is in a sleeping state where no electrical power is supplied to the image processing hardware, the second information being obtainable when the image processing is in the active state, the second information not being obtainable when the image processing is in the sleeping state. Further, the instruction further causes the information processing terminal to perform, in the information acquiring process, a first requesting process of transmitting, through the communication interface, first request information requesting the image processing apparatus to transmit the first information, a first receiving process of receiving the first information, as a response to the first request information, from the image processing apparatus through the communication interface, a first determining process of determining whether a set value of the first information received in the first receiving process is the first value or the second value. In response to determination, in the first determining process, that first information is set to the first value, the instructions further cause the information processing terminal to perform a second requesting process of transmitting, through the communication interface, second request information requesting the image processing apparatus to transmit the second information, and a second receiving process of receiving the second information, as a response to the second request information, from the image processing apparatus through the communication interface. In response to determination, in the first determining process, that the first information is set to the second value, the instructions cause the information processing terminal to perform none of the second requesting process and the second receiving process.

According to aspects of the disclosures, there is provided a non-transitory computer-readable recording medium storing computer-readable instructions for an information processing terminal having a communication interface, a display and a controller. The computer-readable instructions, when executed by the controller, cause the information processing terminal to repeatedly, at every particular time interval, perform an information acquiring process of acquiring, from an image processing apparatus having image processing hardware configured to process image data, status information representing a status of the image processing apparatus. The status information includes at least one of first information and second information, the first information being set to a first value when the image processing hardware is in an active state where an electrical power is supplied to the image processing hardware, the first information being set to a second value when the image processing hardware is in a sleeping state where no electrical power is supplied to the image processing hardware, the second information being obtainable when the image processing is in the active state, the second information not being obtainable when the image processing is in the sleeping state. The instruction further causes the information processing terminal to perform, in the information acquiring process, a first determining process of determining whether a set value of the first information is the first value or the second value. In response to determination in the first determining process that the set value is the first value, perform an all information requesting process of transmitting, through the communication interface, all information request information requesting to transmit both the first information and the second information, to the image processing apparatus, and an all information receiving process of receiving, through the communication interface, the first information and the second information as a response to the all information request information. In response to determination in the first determining process that the set value is the second value, perform, a partial information requesting process of transmitting, through the communication interface, partial information request information requesting to transmit only the first information from among the first information and the second information, to the image processing apparatus, and a partial information receiving process of receiving, through the communication interface, the first information as a response to the partial information request information.

According to aspects of the disclosures, there is provided a non-transitory computer-readable recording medium storing computer-readable instructions for an information processing terminal having a communication interface, a display and a controller. The computer-readable instructions, when executed by the controller, cause the information processing terminal to repeatedly, at every particular time interval, perform, an information acquiring process of acquiring, from an image processing apparatus having image processing hardware configured to process image data, status information representing a status of the image processing apparatus. The status information includes first information and second information, the first information being set to a first value when the image processing hardware is in an active state where an electrical power is supplied to the image processing hardware, the first information being set to a second value when the image processing hardware is in a sleeping state where no electrical power is supplied to the image processing hardware, the second information being obtainable when the image processing is in the active state, the second information not being obtainable when the image processing is in the sleeping state. The instruction further causes the information processing terminal to perform, in the information acquiring process. The instruction further causes the information processing terminal to perform, in the information acquiring process, a requesting process of transmitting status request information to the image processing apparatus through the communication interface, a receiving process of receiving the status information, as a response to the status request information, from the image processing apparatus through the communication interface, a determining process of determining whether a set value of the first information received in the receiving process is the first value or the second value. In response to determination, in the determining process, that the set value is the first value, a next information acquiring process at a timing when a first time period has elapsed since a previous information acquiring process was executed, while in response to determination, in the determining process, that the set value is the second value, a next information acquiring process at a timing when a second time period, which is longer than the first time period, has elapsed since the previous information acquiring process was executed.

BRIEF DESCRIPTION OF THE ACCOMPANYING DRAWINGS

DESCRIPTION OF THE EMBODIMENT AND MODIFICATIONS

Hereinafter, referring to the accompanying drawings, an illustrative embodiment and its modifications will be described. It is noted that the embodiment/modifications described below are only examples and various modifications can be applied without departing from the aspects of the present disclosures.

Figure 1:
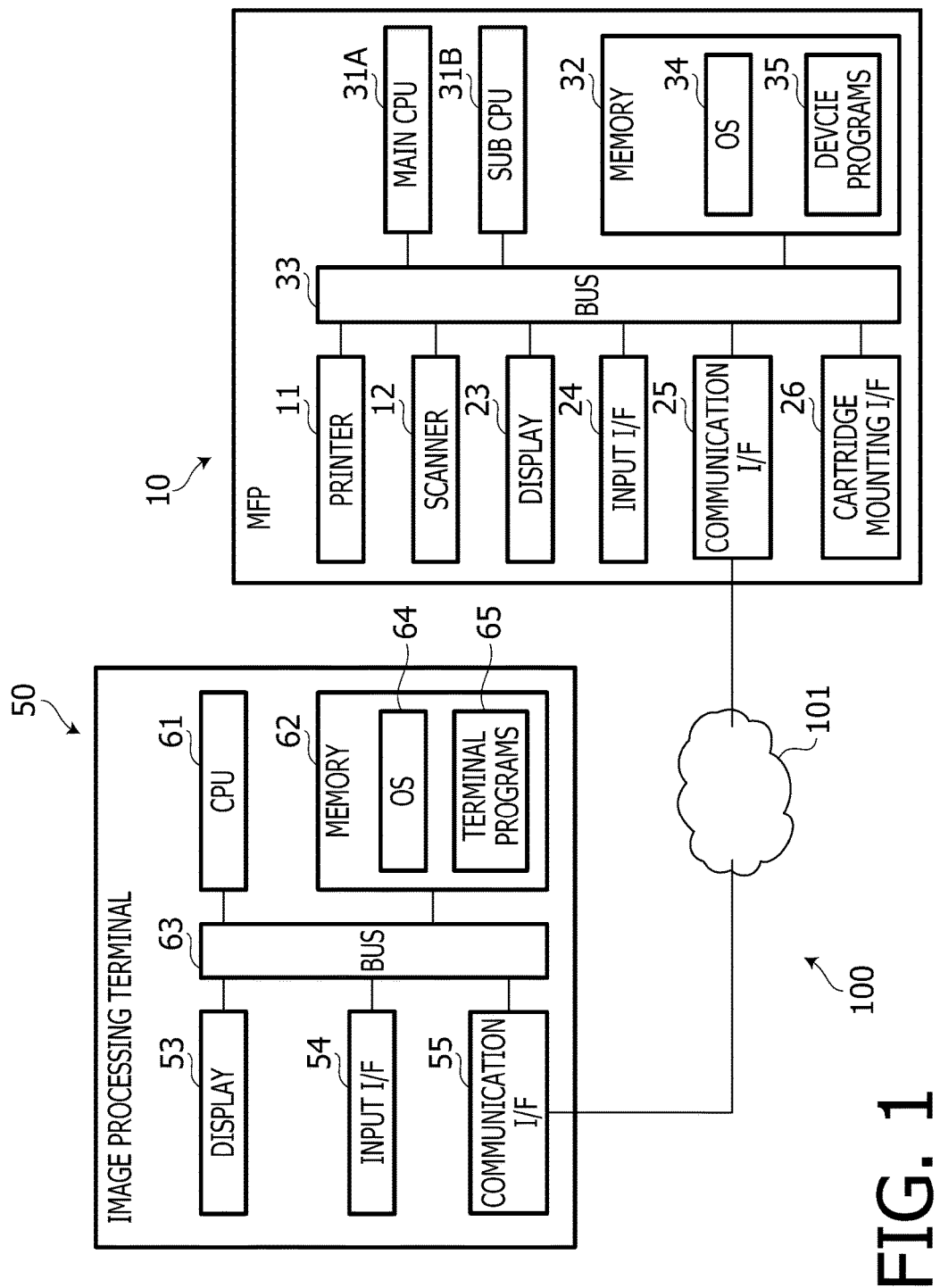
FIG. 1 is a block diagram of an image processing system including an information processing terminal and an MFP (multi-function peripheral) according to an illustrative embodiment of the disclosures.

FIG. 1 schematically shows a block diagram of an image processing system (hereinafter, simply referred to as a "system") 100 according to an illustrative embodiment of the disclosures. The system 100 shown in FIG. 1 includes an MFP (abbreviation of a "Multi-Function Peripheral") 10 and an information processing terminal 50. It is noted that, for the purpose of describing the aspects of the present disclosures, the system 100 may include a single-function printer instead of the MFP 10. The MFP 10 and the information processing terminal 50 are configured to communicate with each other through a communication network 101. It is noted that the communication network 101 need not be limited to an any particular network, and could be the Internet, a wired LAN, a wireless LAN, or a combination of such networks. Alternatively, the MFP 10 and the information processing terminal 50 may be connected by a USB cable or the like.

As shown in FIG. 1, the MFP 10 includes a printer 11, a scanner 12, a display 23, an input I/F 24, a communication I/F 25, a cartridge mounting I/F 26, a main CPU 31A, a sub CPU 31B (hereinafter, the main CPU 31A and the sub CPU 31B are collectively referred to as a CPU 31), a memory 32 and a communication bus 33. The respective components of the MFP 10 are interconnected through the communication bus 33.

The printer 11 is configured to execute a printing operation to record an image represented by image data on a sheet. It is noted that "to record" by the printing operation is also generally referred to "to print". According to the illustrative embodiment, the printer 11 is an inkjet type printer which ejects ink droplets onto the sheet to record an image thereon. It is noted that the recording method of the printer 11 need not be limited to the inkjet method, and a printer employing an electrophotographic image recording method could be used as the printer 11. The scanner 12 is configured to execute a scanning operation to read an image recorded on an original and generate scan data representing the read image.

The display 23 could be an LCD, an organic EL display, or the like, which has a display screen displaying various pieces of information.

The input I/F 24 is configured to receive input operations by a user. Specifically, the input I/F 24 is provided with buttons, and configured to transmit an operation signal corresponding to the button operated by the user to the CPU 31. It is noted that the input I/F 24 may be provided with a film-type touch sensor overlaid on the display screen of the display 23. An operation of the user to designate an object displayed on the display screen of the display 23, and an operation of the user to input letters, character strings and/or numeral strings are examples of a user operation. It is noted that the term "object" here refers to, for example, character strings, icons, buttons, links, radio buttons, check boxes, pull-down menus and the like, which are displayed on the display 23.

When the input I/F 24 is realized as the touch sensor, the input I/F 24 outputs location information indicative of a location on the display screen at which the user has touched. It is noted that the term "touch" includes all the operations to cause an inputting medium to contact the display screen. It is noted that "hovering" or "floating touch" which is an operation to cause the inputting medium to be located close to the display screen so that a distance between the inputting medium and the display screen is very small may be included in the concept represented by the term "touch". Further, the inputting medium could be a finger of the user, a touch pen and the like. An user operation to tap an position of an object displayed on the display screen of the display 23 is an example of a designating operation to designate the object.

The communication I/F 25 is an interface configured to communicate with an external device through the communication network 101. That is, the MFP 10 is configured to transmit various pieces of information to the external device through the communication I/F 25 and/or receive various pieces of information from the external device through the communication I/F 25. A communication procedure employed in the communication I/F 25 need not be limited to any particular procedure, and Wi-Fi (registered trademark) may be employed, for example. When the MFP 10 and the information processing terminal 50 are connected with the USB cable or the like, the communication I/F 25 may be a USB interface configured such that a USB cable can be detachably attached thereto.

The cartridge mounting I/F 26 is configured such that ink cartridges storing ink are mounted thereon. The printer 11 is configured to eject the ink stored in the ink cartridges mounted on the cartridge mounting I/F 26 when executing the printing operation. According to the illustrative embodiment, four ink cartridges respectively storing black ink, cyan ink, magenta ink and yellow ink are mounted on the cartridge mounting I/F 26 such that each of the ink cartridges is independently and detachably attached. The cartridge mounting I/F 26 is provided with a sensor (not shown) configured to detect a remaining amount of the ink (hereinafter, referred to as remainder of ink) stored in each of the four ink cartridges mounted thereon individually.

It is noted that the ink stored in each ink cartridge is an example of consumables which the image processing hardware uses to process the image data. The example of the consumables should not be limited to the ink. The example of the consumables may include sheets accommodated in a tray. When an electrophotographic printer is employed, the example of the consumables include toner stored in a toner cartridge. Further, the remainder of ink is an example of conditions of the consumables. It is noted that the sensor for detecting the conditions of the consumables may be a mechanical sensor, an optical sensor, a software sensor configured to count used amount of the consumables, and a combination of two or all of them.

The CPU 31 is configured to control an entire operation of the MFP 10. The CPU 31 is configured to retrieve programs from the memory 32 based on various pieces of information input through the input I/F 24 and received from the external device through the communication I/F 25, and execute the same. Specifically, the main CPU 31A is configured to control the MFP 10 by retrieving a device program 35 (described later) from the memory 32 and executing the same. The sub CPU 31B is configured to control the MFP 10 in accordance with instructions transmitted from the main CPU 31A. In this regard, the main CPU 31A is an example of a first controller, while the sub CPU 31B is an example of a second controller. It is noted that the main CPU 31A and the sub CPU 31B may be mounted on a substrate as separate chips or a single integrated chips.

The memory 32 stores an OS 34 and the device program 35. The device program 35 may be a single program or a collection of multiple programs. The memory 32 stores data and/or information which are necessary when the device program 35 is executed. The memory 32 may be configured, for example, by a RAM, a ROM, an EEPROM, an HDD, a portable recording medium such as a USB memory which can be detachably attached to the MFP 10, a buffer provided to the CPU 31, and/or any combination thereof.

The memory 32 may be a computer-readable storage medium. The computer-readable storage medium is a non-transitory medium. The non-transitory medium includes a recording medium such as a CD-ROM, a DVD-ROM and the like. It is noted that the non-transitory medium is also a tangible medium. It is noted that electrical signal carrying programs downloaded from a server on the Internet or the like is a computer-readable signal medium which is a kind of the computer-readable medium, but is not the non-transitory computer-readable storage medium. The above applies to a memory 62 of the information processing terminal 50 described later.

The device program 35 causes, when executed by the CPU 31A, the printer 11 to execute the printing operation in response to receipt of print instruction information from the information processing terminal 50 through the communication I/F 25. It is noted that the print instruction information is information instructing execution of the printing operation and includes, for example, image data subjected to the printing operation. Further, the device program 35 causes, when executed by the CPU 31A, the scanner 12 to execute a scanning operation in response to receipt of scan instruction information from the information processing terminal 50 through the communication I/F 25. It is noted that the scan instruction information is information instructing execution of the scanning operation and include, for example, information designating a storing destination (e.g., the USB memory, the information processing terminal 50, or the like) in which the generated scan data is to be stored. Hereinafter, the print instruction information and the scan instruction information will be collectively referred to as instruction information.

The device program 35 transmits status information to the information processing terminal 50 through the communication I/F 25 in response to receipt of the status request information from the information processing terminal 50 through the communication I/F 25. The status request information is information to be sent to request for transmission of the status information. It is noted that the status request information is one of all information request information, partial information request information, first request information and second request information, which will be described in detail later. The status information is information indicative of the status of the MFP 10. It is noted that the status information includes at least one of power source information and remainder information, which will be described later.

The MFP 10 has a power supply (not shown), which is configured to supply a power. It is noted that the power supply supplies an electrical power, which is supplied from an external power source through a power plug, to respective components of the MFP 10. Then, the MFP 10 operates using the power supplied from the external power source through the power supply of the MFP 10. It is noted that the operation status of the power supply of the MFP 10 can be switched between the active state and the sleeping state.

The active state is defined as a state in which the power is supplied at least to the printer 11 and the scanner 12. Specifically, the active state can be defined as a state in which the power is supplied to all the components of MFP 10 shown in FIG. 1. The sleeping state is defined as a state in which no power is supplied at least to the printer 11 and the scanner 12. Specifically, the sleeping state can be defined as a state in which the power is supplied to the input I/F 24, the communication I/F 25, the main CPU 31A, a part of the memory 32 (e.g., the ROM, the EEPROM), while no power is supplied to the printer 11, the scanner 12, the display 23, the cartridge mounting I/F 26, the sub CPU 31B, and the other part of the memory 32 (e.g., the RAM).

The main CPU 31A switches the operation status of the power supply from the sleeping state to the active state in response to, for example, receipt of a user operation through the input I/F 24 when the power supply is in the sleeping state, in response to receipt of instruction information or the all information request information (described later) through the communication I/F 25. Further, the main CPU 31A starts a sleep timer configured to detect elapse of a particular threshold time in response to switch of the status of the power supply to the active state. It is noted that, according to the illustrative embodiment, the sleep timer is realized by software. It is further noted that the sleep timer could of course be realized by hardware.

The main CPU 31A switches the status of the power supply from the active state to the sleeping state in response to non-receipt of the user operation through the input I/F 24 and non-receipt of the instruction information or the all information request information until timeout of the sleep timer. In contrast, the main CPU 31A resets the sleep timer in response to receipt of the user operation through the input I/F 24 or receipt of the instruction information through the communication I/F 25 before the timeout of the sleep timer. It is noted that the main CPU 31A does not reset the sleep timer even if the main CPU 31A receives the status request information through the communication I/F 25 before the timeout of the sleep timer.

The main CPU 31A stores the power source information representing the status of the power supply in the EEPROM of the memory 32 in response to switching of the status of the power supply from one of the active state and the sleeping state to the other. The CPU 31A is configured to read the power source information from the EEPROM. It is noted that the power source information stored in the EEPROM is an example of first information, which is set to a first value "ready" when the power supply is in the active state, while set to a second value "sleep" when the power supply is in the sleeping state. The power source information is a piece of information stored in the EEPROM and is retrievable regardless whether the power supply is in the active state or the sleeping state. Further, the power source information is information to be retrieved by the main CPU 31A.

The sub CPU 31B is configured to obtain the remainder information indicating the remainder of ink from the sensor. In response to receipt of a request for the remainder information from the main CPU 31A, the sub CPU 31B obtains the remainder information from the sensor, stores the remainder information in the RAM of the memory 32, and transmits a pointer indicating a head address of an area of the RAM storing the remainder information to the main CPU 31A. The remainder information is an example of second information which indicates status of consumables. The remainder information is information stored in the RAM and is retrievable only when the power supply is in the active state. It is noted that the remainder information is information to be retrieved by the sub CPU 31B.

The remainder information is information indicating a percentage of the current remainder of ink in each ink cartridge where the remainder of ink in a new cartridge is 100%. The remainder information includes, for example, the remainder of the black ink, the remainder of the cyan ink, the remainder of the magenta ink, and the remainder of the yellow ink. It is noted that the remainder information need not be limited to the above. For example, the remainder information may be information indicating whether the remainder of ink is equal to or more than a threshold amount, or less than the threshold amount.

The information processing terminal 50 has, as shown in FIG. 1, a display 53, an input I/F 54, a communication I/F 55, a CPU 61, a memory 62 and a communication bus 63. Since the display 53, the input I/F 54, the communication I/F 55, the CPU 61, the memory 62 and the communication bus 63 have substantially the same configurations as the display 23, the input I/F 23, the communication I/F 25, the CPU 31, the memory 32 and the communication bus 33 of the MFP 10, respectively, detail description thereof will be omitted. The CPU 61 and the memory 62 constitute an example of a controller. It is noted that the CPU 61 of the information processing terminal 50 need not be divided into a main CPU and a sub CPU.

The information processing terminal 50 could be a feature phone, a smartphone, a tablet terminal, or a PC. It is preferable that the display 53 of the information processing terminal 50 is configured such that the size of the display screen is twelve inches or less, and more preferably eight inches or less. It is also preferable that the input I/F 54 of the information processing terminal 50 is a touch panel overlaid on the display screen of the display 53.

It is noted that the memory 62 is configured to store the status information and a communication flag (hereinafter, also referred to as "COM flag". The status information is the information obtained from the MFP 10 during execution of a status acquiring process (described later). The COM flag is information indicating whether the terminal processing terminal 50 can communicate with the MFP 10 or not. Specifically, the COM flag is set to a third value "online" indicating that the information processing terminal 50 can communicate with the MFP 10, or a fourth value "offline" indicating that the information processing terminal 50 cannot communicate with the MFP 10.

Hereinafter, the system 100 according to the illustrative embodiment will be described, referring to FIGS. 2 and 3.

It is noted that flowcharts shown in the accompanying drawings show processes the CPU 31 executes instructions described in programs. That is, in accordance with the instructions described in the programs, the CPU 31 executes processes to "determine", "extract", "select", "calculate", "make a decision", "identify", "control" and the like. It is noted that the processes executed by the CPU 31 include controlling of hardware via the OS 34. Further, the term "data" in the specification is represented by computer-readable bit strings. Multiple pieces of data having different formats but substantially the same contents will be treated as the same data. The term "information" in the specification is treated in the same manner.

The OS 64 of the information processing terminal starts terminal program 65 in response to receipt of the user operation instructing starting up of the terminal program 65 through the input I/F 54. The terminal program 65 executes, when started by the OS 64, a status displaying process shown in FIG. 2.

In the status displaying process (FIG. 2), the terminal program 95 firstly executes an all information acquiring process (S11). It is noted that the all information acquiring process is an example of an acquiring process of acquiring both the power source information and the remainder information from the MFP 10. Specifically, the all information acquiring process is a process of acquiring the status information which includes both the power source information and the remainder information from the MFP 10 without determining whether the MFP 20 is in the active state or sleeping state.

Hereinafter, referring to S46-S49 of the status acquiring process shown in FIG. 5, the all information acquiring process will be described. Firstly, the terminal program 65 transmits the all information request information to the MFP 10 through the communication I/F 55 (S46). It is noted that the all information request information is an example of the status request information to request the MFP 10 to transmit both the power source information and the remainder information. Next, the terminal program 65 receives the status information including the power source information and the remainder information from the MFP 10 through the communication I/F 55 as a response to the all information request information (S47). It is noted that S46 is an example of an all information requesting process, and S47 is an example of an all receiving process.

Then, the terminal program 65 stores the received status information in the memory 62. At this stage, when the status information has already been stored in the memory 62, the terminal program 65 overwrites the status information having already been stored in the memory 62 with the newly received status information. Thus, in the memory 62, the status information acquired in the recent acquiring process is stored.

In response to receipt of the status information (S47: YES), the terminal program 65 sets the COM flag to the third value "on line" (S48), and terminates the all information acquiring process. On the other hand, in response to non-receipt of the status information (S47: NO), the terminal program 65 sets the COM flag to the fourth value "off line" (S49) and terminates the all information acquiring process.

The non-receipt of the status information (S47) is caused when a TCP connection to transmit the all information request information cannot be established with the MFP 10, when no status information is received after a particular time has elapsed since the all information request information was transmitted, or the like. It is noted that a process of determining whether the information processing terminal 50 can communicate with the MFP 10 is an example of a second determining process. So are the process in S32, S35 and S43.

Although not shown in the drawings, the device program 35 of the MFP 10 receives the all information request information from the information processing terminal 50 through the communication I/F 25. Then, the device program 35 retrieves the power source information from the EEPROM through the main CPU 31A. In response to the retrieved power source information being set to the first value "ready", the device program 35 retrieves the remainder information from the RAM through the sub CPU 31B. Thereafter, the device program 35 transmits the status information including the power source information ("ready") retrieved through the main CPU 31A and the remainder information retrieved through the sub CPU 31B to the information processing terminal 50 through the communication I/F 25.

In response to the retrieved power source information being set to the second value "sleep", the device program 35 switches the status of the power supply from the sleeping state to the active state, and changes the content of the power source information stored in the EEPROM from the second value "sleep" to the first value "ready". Thereafter, the device program 35 retrieves the remainder information from the RAM through the sub CPU 31B. Then, the device program 35 transmits the status information, which includes the power source information having been changed (i.e., "ready") and the remainder information retrieved through the sub CPU 31B, to the information processing terminal 50 through the communication I/F 25.

Figure 2:
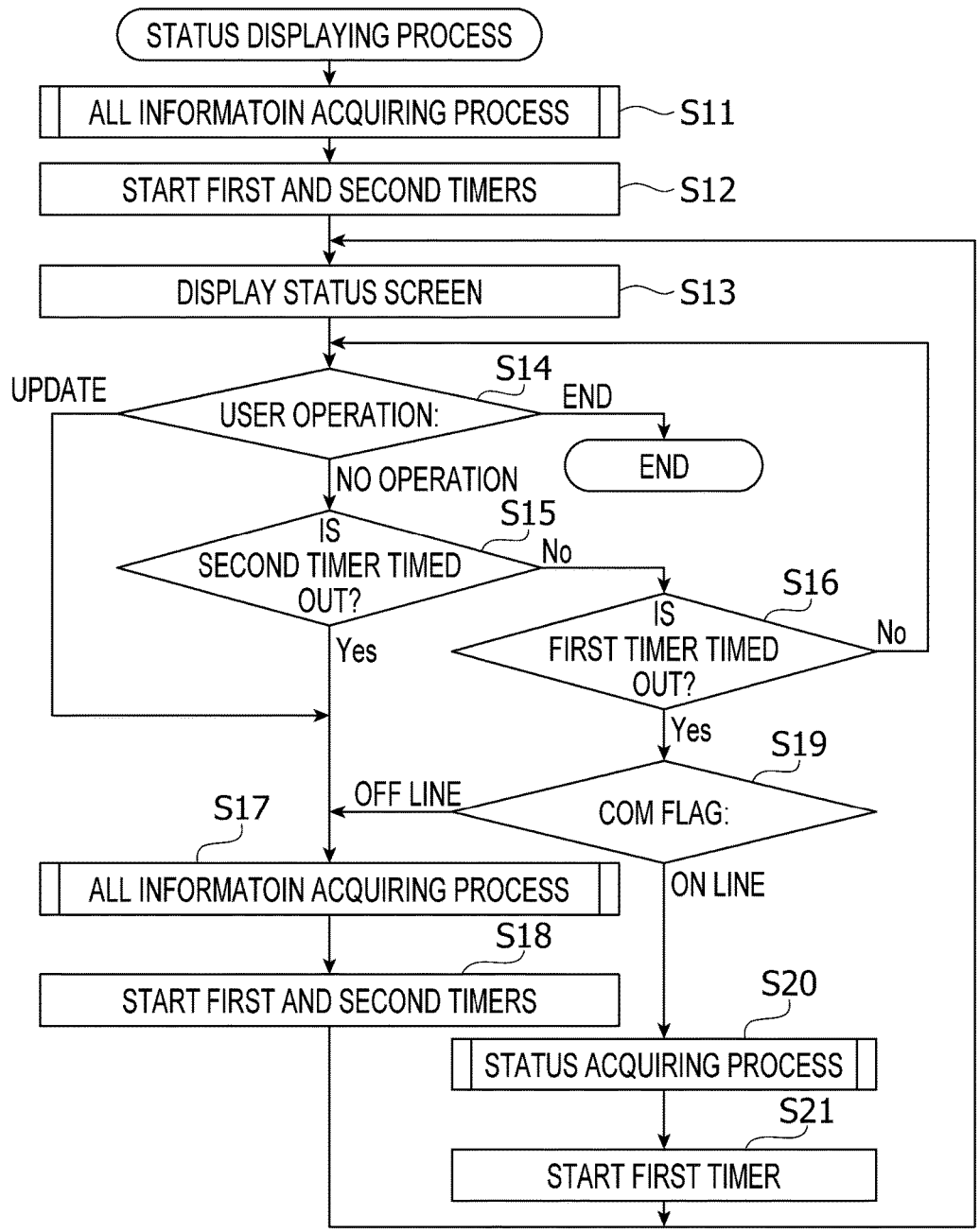
FIG. 2 is a flowchart illustrating a status displaying process executed by the information processing terminal shown in FIG. 1.
Figure 3:
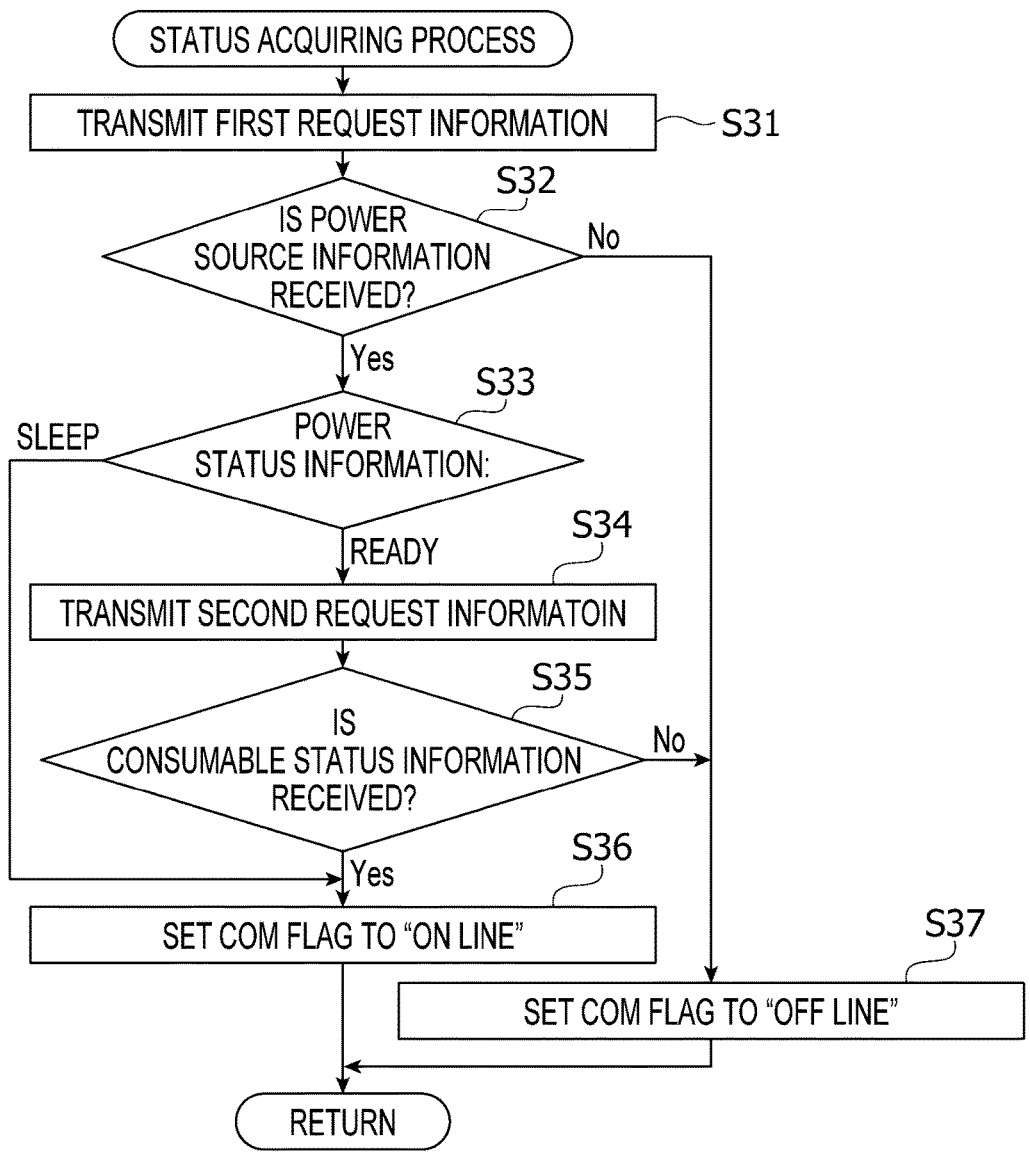
FIG. 3 is a flowchart illustrating a status acquiring process executed by the information processing terminal shown in FIG. 1.

As shown in FIG. 2, the terminal program 65 starts a first timer and a second timer (S12). The first timer is configured to detect elapse of a first time period since the information acquiring process was started, while the second timer is configured to detect elapse of a second time period since the information acquiring process was started. It is noted that the second time period is longer than the first time period. For example, the first time period may be thirty seconds, while the second time period may be three-hundred seconds.

Next, the terminal program 65 displays a status screen (see FIG. 4A or 4B) on the display 53 (S13). The status screen is a screen displaying the status of the MFP 10 represented by the status information acquired in the information acquiring process executed immediately before execution of S13, that is, the status information stored in the memory 62. Then, the terminal program 65 waits, with keeping the status screen displayed, until the user operation with respect to the status screen is received through the input I/F 54 (S14: NO OPERATION) or until timeout of the first timer or the second timer (S15: NO/S16: NO).

Figure 4A:
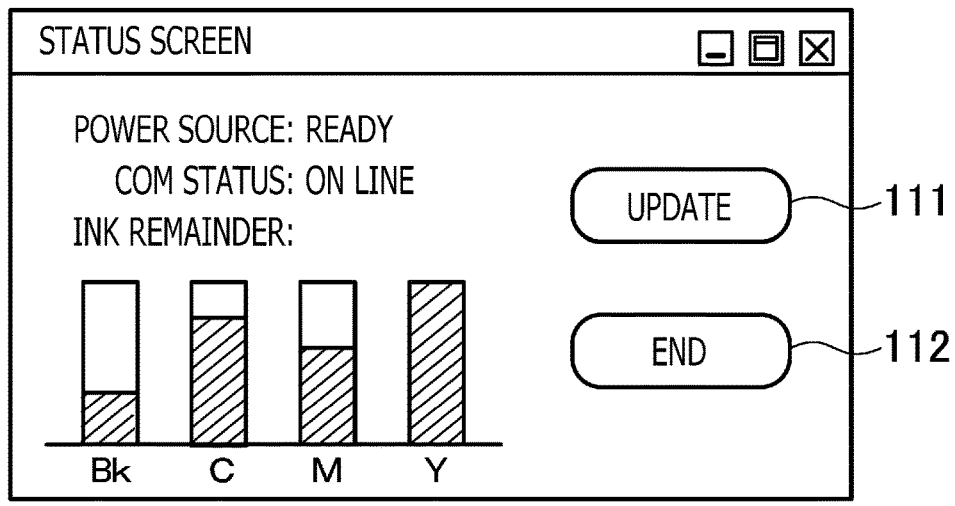
FIG. 4A is an example of a status screen when the MFP is in a ready state.
Figure 4B:
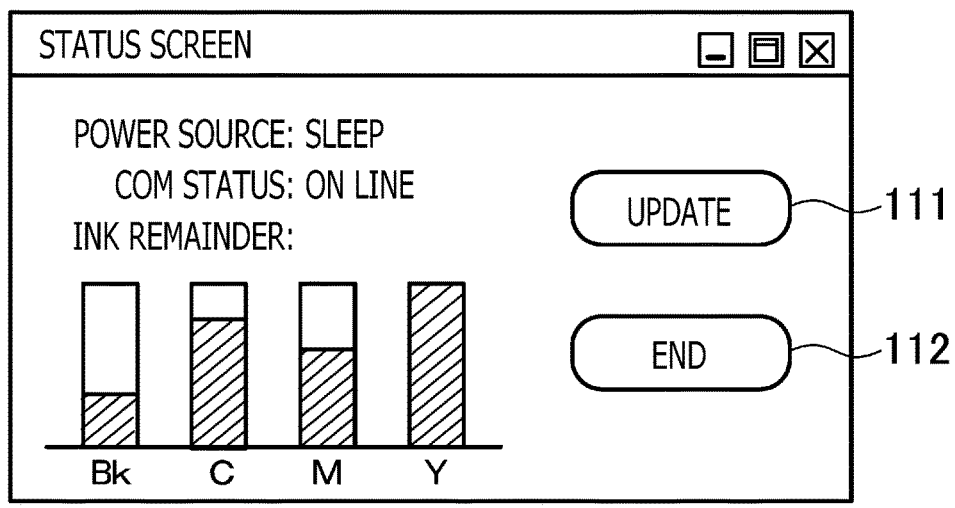
FIG. 4B is an example of the status screen when the MFP is in a sleep state.

As shown in FIGS. 4A and 4B, the status screen includes indications of the status of the power source ("READY" or "SLEEP), the value set to the COM flag ("ON LINE"/"OFF LINE"), a bar graph indicating the remainder of ink represented by the remainder information, an "UPDATE" icon 111 and an "END" icon 112. The "UPDATE" icon 111 is an example of an updating icon corresponding to an instruction to update the status information. The "END" icon is an icon corresponding to an instruction to end the status displaying process.

In response to receipt of designation of the "UPDATE" icon 111 through the input I/F 54 (S14: UPDATE), the terminal program 65 executes S17 and S18. In response to timeout of the second timer without receiving the user operation through the input I/F 54 (S14: NO OPERATION; S15: YES), the terminal program 65 executes S17 and S18. It is noted that when both the first timer and the second timer are timed out at the same time, the terminal program 65 assumes that the second timer is timed out and executes S17 onwards.

In response to timeout of the first timer without receiving the user operation through the input I/F 54 (S14: NO OPERATION; S15: NO; S16: YES), the terminal program 65 determines the value of the COM flag (S19). In response to determination that the COM flag is set to the fourth value "OFF LINE" (S19: OFF LINE), that is, in response to determination that communication with the MFP 10 is disabled in previous execution of the information acquiring process, the terminal program 65 execute S17 and S18. It is noted that the processes in S17 and S18 may be similar to the processes in S11 and S12.

After execution of S17 and S18, the terminal program 65 executes S13. When new status information is received in S17 (S47: YES), the device program 35 displays the status screen based on the new status information (S13). In this case, the communication status on the status screen (indicated as "COM STATUS" on the screen) is displayed as "ON LINE". When the new status information is not received in S17 (S47: NO), the device program 35 displays, in S13, the status screen based on the status information which has already been stored in the memory 62 before execution of S17. In this case, the communication status on the status screen is displayed as "OFF LINE".

In response to determination that the first timer is timed out and the COM flag is set to the third value "ON LINE" (S16: YES; S19: ON LINE), the terminal program 65 executes a status acquiring process (S20). The status acquiring process is an example of the information acquiring process of acquiring both of the power source information and the remainder information, or only the power source information from the MFP 10.

Hereinafter, referring to FIG. 3, the status acquiring process will be described in detail. Firstly, the terminal program 65 transmits, through the communication I/F 55, the first request information to the MFP 10 (S31). The first request information is an example of the status request information which requests the MFP 10 to transmit only the power source information between the power source information and the remainder information. The process of S31 is an example of a first requesting process.

Although drawings are omitted, the device program 35 of the MFP 10 receives the first request information from the information processing terminal 50 through the communication I/F 25. Then, the device program 35 retrieves the power source information through the main CPU 31A. The device program 35, then, transmits the status information including the retrieved power source information to the information processing terminal 50 through the communication I/F 25. The above-described process is executed regardless whether the power supply is in the active state or the sleeping state. It is noted that, by the above process, the status of the power supply is not switched.

Next, the terminal program 65 receives the status information including only the power source information between the power source information and the remainder information from the MFP 10 through the communication I/F 55 in response to the first request information (S32: YES). Thereafter, the terminal program 65 stores the power source information received in S31 in the memory 62. It is noted that the remainder information stored in the memory 62 is not overwritten. Next, in S33, the terminal program 65 determines which of the first value and the second value is set in the power source information received in S32. It is noted that S32 is an example of the first receiving process, while S33 is an example of a first determining process.

In response to determination, in S32, that the received power source information is set to the first value "ready" (S33: READY), the terminal program 65 transmits second request information to the MFP 10 through the communication I/F 55 (S34). The second request information is an example of the status request information requesting the MFP 10 to transmit only the remainder information between the power source information and the remainder information. S31 is an example of a second requesting process.

Although drawings are omitted, the device program 35 of the MFP 10 receives the second request information from the information processing terminal 50 through the communication I/F 25. Then, the device program 35 retrieves the remainder information through the sub CPU 31B. The device program 35, then, transmits the status information including the retrieved remainder information to the information processing terminal 50 through the communication I/F 25. The above-described process is executed only when the power supply is in the active state.

Next, the terminal program 65 receives the status information including only the remainder information between the power source information and the remainder information from the MFP 10 through the communication I/F 55 in response to the second request information (S35: YES). Then, the terminal program 65 stores the remainder information received in S35 in the memory 62. It is noted that the power source information having already been stored in the memory 62 is not overwritten. S35 is an example of a second receiving process. Thereafter, the terminal program 65 sets the COM flag to the third value "on line" (S36), and terminates the status acquiring process.

In response to determination, in S32, that the received power source information is set to the second value "sleep" (S33: SLEEP), the terminal program 65 skips S34 and S35, sets the COM flag to the third value "on line" (S36), and terminates the status acquiring process. Thus, in response to determination that the MFP 10 is in the sleeping state, the terminal program 65 does not transmit the second request information to the MFP 10.

In response to not receiving the remainder information through the communication I/F 55 (S35: NO), the terminal program 65 skips S36, sets the COM flag to the fourth value "off line" (S37), and terminates the status acquiring process. Further, in response to not receiving the power source information through the communication I/F 55 (S32: NO), the terminal program 65 skips S33-S36, sets the COM flag to the fourth value "off line" (S37), and terminates the status acquiring process.

As shown in FIG. 2, in response to execution of the status acquiring process, the terminal program 65 starts the first timer (S21). It is noted that the second timer, which was started in S12 or S18 is not reset. After execution of S21, the terminal program 65 executes S13. Since S13 executed here is the same as S13 which is executed after execution of S18, description of S13 here is omitted. The terminal program 65 repeatedly executes the above processes until the "END" icon 112 is tapped.

As described above, the terminal program 65 executes the information acquiring process (S17, S20) and the displaying process (S13) every time when the first timer or the second timer is timed out. In other words, the terminal program 65 executes the information acquiring process (S17, S20) and the displaying process (S13) at every particular time period. Further, in response to the "UPDATE" icon 111 being tapped, the terminal program 65 executes a next information acquiring process before timeout of the first timer or the second timer. Furthermore, in response to receipt of designation of "END" icon 112 through the input I/F 54 (S14: END), the terminal program 65 terminates the status displaying process.

<Effects of the Illustrative Embodiment>

According to the system 100 described above, when the power source information is set to the first value "ready", a request for the remainder information is transmitted, while the request for the remainder information is not transmitted when the power source information is set to the second value "sleep". Accordingly, it becomes possible to suppress switching of the status of the MFP 10 from the sleeping state to the active sate for transmitting the remainder information to the information processing terminal 50. Further, since the MFP 10 transmits the status information in response to the request from the information processing terminal 50, load to the MFP 10 or the communication network 101 will not be increased.

If the status of the MFP 10 has been changed from the sleeping state to the active state and changed to the sleeping state again before the first timer is timed out, there is a possibility that the information processing terminal 50 has not been able to receive the remainder information for a relatively long period. That is, there is a possibility that the latest status of the MFP 10 may not be notified through the status screen. Therefore, as described above, the information processing terminal is configured to receive both the power source information and the remainder information regardless of the status of the MFP 10 at a timing when the second timer, of which monitoring time period is longer than that of the first timer, is timed out. According to this configuration, change of the status of the MFP 10 can be notified appropriately.

There is a possibility that the communication between the MFP 10 and the information processing terminal 50 is temporarily disabled due to various causes such as excessive increase of traffic of the communication network. If the status of the MFP 10 has been changed from the sleeping mode to the active mode and changed to the sleeping mode again during such a communication-disabled period, there is a possibility that the information processing terminal 50 has not been able to receive the remainder information for a relatively long period. Therefore, as described above, if the communication was disabled during the previous information acquiring process, the information processing terminal is configured to receive both the power source information and the remainder information regardless of the status of the MFP 10 at a timing when the second timer, of which monitoring time period is longer than that of the first timer, is timed out. According to this configuration, change of the status of the MFP 10 can be notified appropriately.

It is likely that the user of the information processing terminal 50 taps the "UPDATE" icon 111 when, for example, he/she wishes to know the latest status of the MFP 10. By configuring the system 100 such that the information processing terminal 50 receives both the power source information and the remainder information regardless of the status of the MFP 10 when the "UPDATE" icon 111 is tapped, it is possible that the information processing terminal 50 notifies the user of the latest status of the MFP 10.

It is noted that the first information the information processing terminal 50 receives in S32, S43 and S47 need not be limited to the power source information itself. That is, the first information could be any other information representing another status of the MFP 10 as far as it is set to different values depending on whether the MFP 10 is in the active state or the sleeping state.

It is noted that the first information the information processing terminal 50 receives in S32, S43 and S47 may optionally include information different from the status of the power source. Specifically, the device program 35 may optionally receive, for example, in S32, S43 or S47, notification information which the MFP 10 receives, through the communication I/F 25, from a not-shown server, history information indicative of presence/absence of data the MFP 10 receives by facsimile through a not-shown facsimile device of the MFP 10, timer information indicating a remaining time period until the MFP 10 executes a printing operation at a particular time, or the like.

It is also noted that the second information the information processing terminal 50 receives in S35 and S47 need not be limited to the remainder information which indicates the remainder of ink. Other examples of the remainder information may include a remainder of toner stored in toner cartridges, remainder of sheets placed on the tray, and the like. Further, the second information need not be limited to the remainder information. That is, the second information may be information indicating whether or not a conveying path in the printer 11 or the scanner 12 is in a jammed state as foreign matters are clogged therein.

<First Modification>

According to the above-described illustrative embodiment, the power source information and the remainder information are subsequently acquired from the MFP 10 in the status acquiring process shown in FIG. 3. It is noted that embodiments of the status acquiring process need not be limited to the process shown in FIG. 3.

Figure 5:
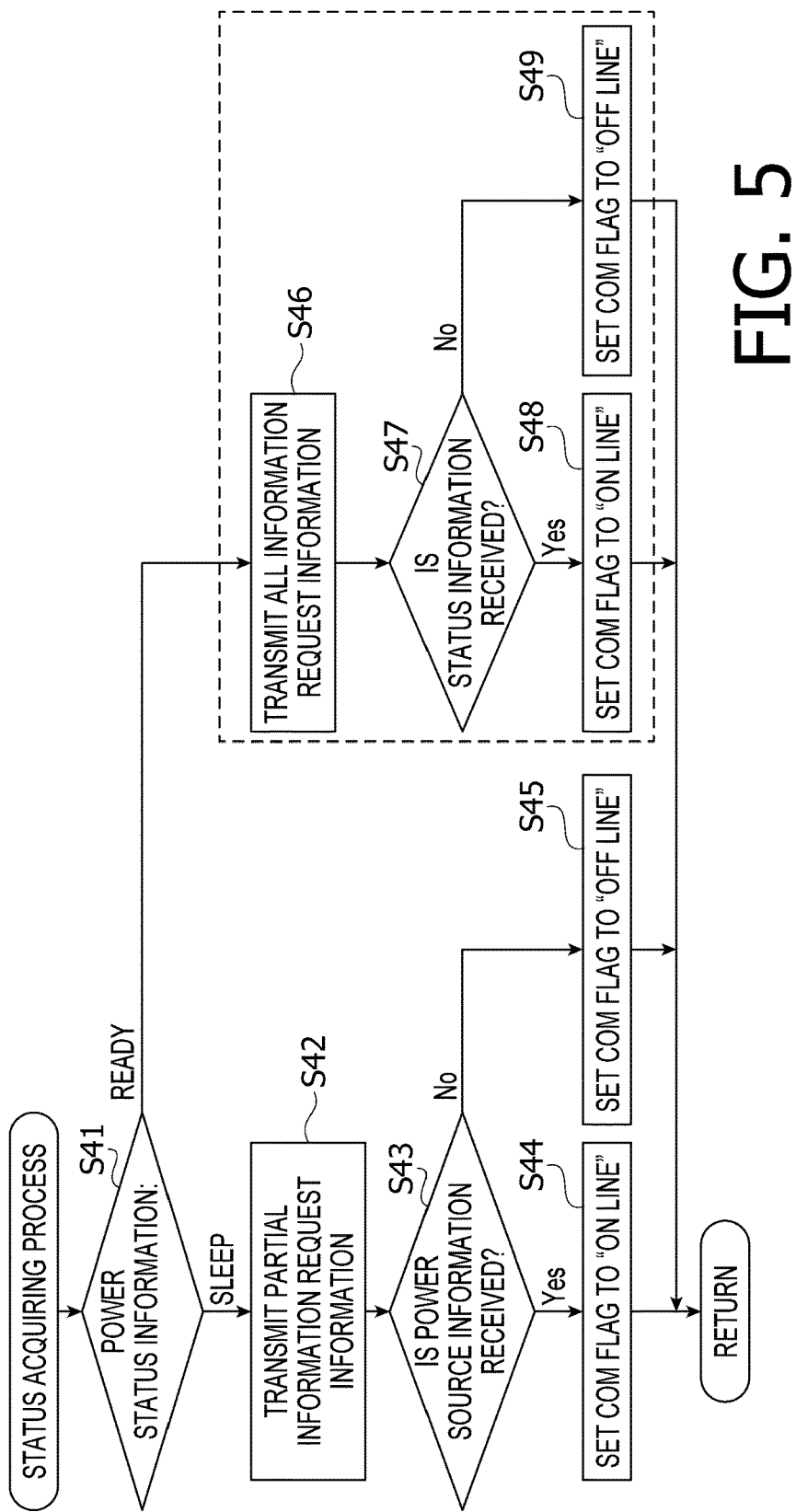
FIG. 5 is a flowchart illustrating the status acquiring process according to a first modification.

FIG. 5 is a flowchart illustrating the status acquiring process according to a first modification. In FIG. 5 and following description regarding the first modification, detailed description on steps similar to those included in FIG. 3 will be omitted, while steps different from the illustrative embodiment will mainly described.

Firstly, the terminal program 65 determines which of the first value and the second value is set to the power source information stored in the memory 62 (S41). That is, the terminal program 65 determines the set value of the power source information acquired from the MFP 10 in the previous information acquiring process. It is noted that S41 is an example of the first determining process.

In response to determination that the power source information is set to the first value "ready" (S41: READY), the terminal program 65 executes S46-S49. Since S46-S49 are the same as the all information acquiring process described above, detailed description thereof will be omitted.

Although not shown in the drawings, the device program 35 of the MFP 10 receives the all information request information from the information processing terminal 50 through the communication I/F 25. Then, the device program 35 retrieves the power source information from the EEPROM through the main CPU 31A. In response to the retrieved power source information being set to the first value "ready", the device program 35 retrieves the remainder information from the RAM through the sub CPU 31B. Thereafter, the device program 35 transmits the status information including the power source information ("ready") retrieved through the main CPU 31A and the remainder information retrieved through the sub CPU 31B to the information processing terminal 50 through the communication I/F 25.

In response to the retrieved power source information being set to the second value "sleep", the device program 35 switches the status of the power supply from the sleeping state to the active state, and changes the content of the power source information stored in the EEPROM from the second value "sleep" to the first value "ready". Thereafter, the device program 35 retrieves the remainder information from the RAM through the sub CPU 31B. Then, the device program 35 transmits the status information, which includes the retrieved power source information and the retrieved remainder information through the sub CPU 31B, to the information processing terminal 50 through the communication I/F 25. It is noted that the status information as transmitted includes the retrieved power source information before the status of the MFP 10 is switched to the active state, that is, the power source information which is set to the second value "sleep". Further, according to the first modification, the threshold time of the sleep timer is shorter than the first time period of the first timer.

In response to determination that the power source information is set to the second value "sleep" (S41: SLEEP), the terminal program 65 terminates the partial information request information to the MFP 10 through the communication I/F 55 (S42). The partial information request information according to the first modification corresponds to the first request information according to the illustrative embodiment (see S31 of FIG. 3). Next, the terminal program 65 receives the status information including only the power source information between the power source information and the remainder information from the MFP 10 through the communication I/F 55 in response to the partial information request information (S43: YES). S42 is an example of the partial information requesting process, and S43 is an example of a partial information receiving process. Since S42-S45 are similar to S23, S33, S36 and S37 of the illustrative embodiment, description thereof will be omitted.

<Second Modification>

According to the illustrative embodiment, when the MFP 10 is in the active state, transmission of the remainder information is requested, while transmission of the remainder information is not requested when the MFP 10 is in the sleeping state. The status displaying process need not be limited to a configuration shown in FIG. 2.

Figure 6A:
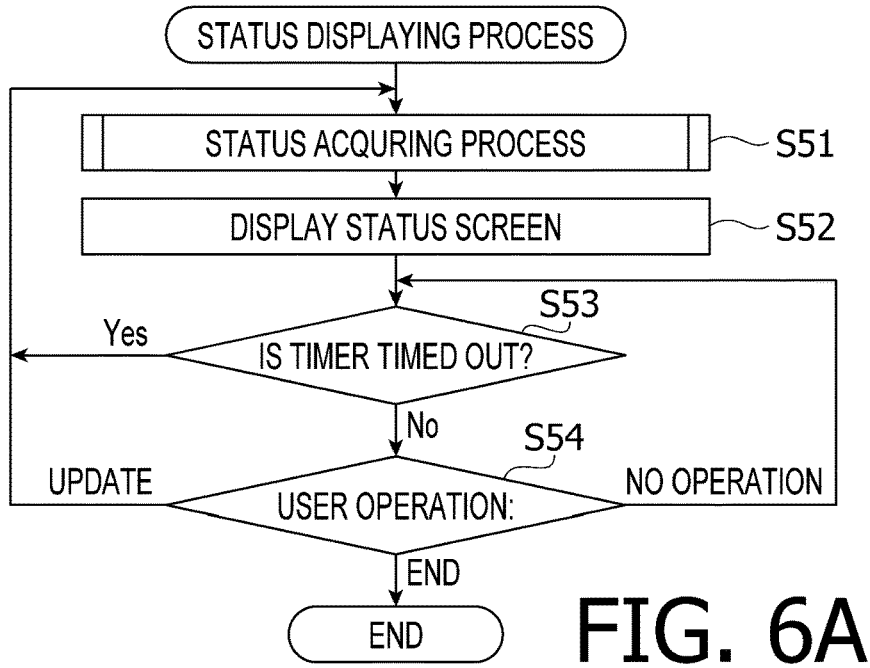
FIG. 6A is a flowchart illustrating a status displaying process according to a second modification of the illustrative embodiment.
Figure 6B:
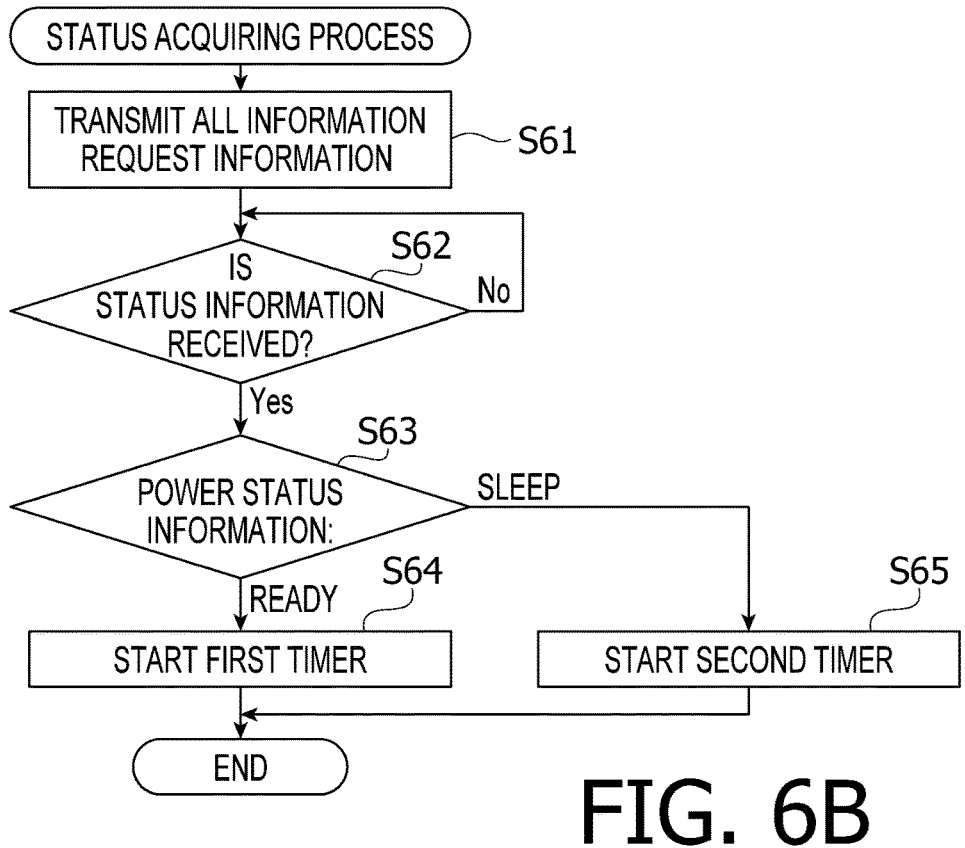
FIG. 6B is a flowchart illustrating the status acquiring process according to the second modification of the illustrative embodiment.

Hereinafter, referring to FIGS. 6A and 6B, another example of the status displaying process and the status acquiring process will be described. In FIGS. 6A and 6B, and in the following description regarding the second modification, detailed description on steps similar to those included in FIGS. 2 and 3 will be omitted, while steps different from the illustrative embodiment will mainly described.

In response to the OS 64 of the information processing terminal starting terminal program 65, the terminal program 65 executes the status displaying process shown in FIG. 6A. Then, in the status displaying process, the terminal program 65 firstly executes the status acquiring process (S51). S51 is an example of the information acquiring process.

Referring to FIG. 6B, the status acquiring process will be described. Firstly, the terminal program 65 transmits the all information request information to the MFP 10 through the communication I/F 55 (S61). Then, the terminal program 65 receives the status information including both the power source information and the remainder information from the MFP 10 though the communication I/F 55 in response to the all information request information (S62). Next, the terminal program 65 stores the status information received in S62 in the memory 62. That is, in the status acquiring process according to the second modification, the terminal program 65 always acquire the status information including both the power source information and the remainder information from the MFP 10. Since S61 and S62 are similar to S46 and S47 in FIG. 5, detailed description thereof will be omitted. S61 is an example of the requesting process, while S62 is an example of the receiving process.

In S63, the terminal program 65 determines which of the first value and the second value is set to the power source information received in S62. S63 is an example of the determining process. Then, in response to the power source information being set to the first value "ready" (S63: READY), the terminal program 65 starts the first timer (S64), while the terminal program 65 start6s the second timer in response to the power source information being set to the second value "sleep" (S63: SLEEP). Thereafter, the terminal program 65 terminates the status acquiring process.

As shown in FIG. 6A, the terminal program 65 displays the status screen based on the status information acquired in S41 on the display 53 (S52). S52 is an example of the displaying process. Then, the terminal program 65 waits, with keeping the status screen displayed, until the timer started in S64 and/or S65 is timed out (S53: NO) or until designation of the icon 111 or 112 is received through the input I/F 54 (S54: NO OPERATION).

In response to timeout of the timer started in S64 or S65 (S53: YES), or in response to receipt of user's designation of the "UPDATE" icon 111 through the input I/F 54 (S54: UPDATE), the terminal program 65 executes S51 onwards. That is, the terminal program 65 acquires new status information from the MFP 10, and updates the displayed contents of the status screen based on the acquired status information.

In response to start of the first timer in S64, the terminal program 65 executes the next status acquiring process at a timing the first time period has elapsed since receipt of the status information. In response to start of the second timer in S65, the terminal program 65 executes the next status acquiring process at a time the second time period has elapsed since receipt of the status information. Thus, the interval between subsequent executions of the status acquiring process is longer in a case where it is determined that the MFP 10 is in the sleeping state than in a case where it is determined that the MFP 10 is in the active state.

Further, in response to the "UPDATE" icon 111 being tapped (S54: UPDATE), the terminal program 65 executes the next status acquiring process before each of the timers started in S64 and S65 is timed out. Then, in response to receipt of the user's designation of "END" icon 112 through the input I/F 54 (S54: END), the terminal program 65 terminates the status displaying process.

According to the second modification, when the power source information received in S62 is set to the first value "ready", the interval between subsequent executions of the information acquiring process is shorter, while when the power source information is set to the second value "sleep", the interval is longer. According to this configuration, it is possible to suppress switching of the status of the MFP 10 from the sleeping state to the active state in order to transmit the remainder information to the information processing terminal 50. Further, since the MFP 10 is configured to transmit the status information in response to the request from the information processing terminal 50, load to the MFP 10 and/or the communication network 101 will not be increased.

Although not shown in the drawings, the terminal program 65 may be configured to determine whether the information processing terminal 50 can communicate with the MFP 10 in S62, and set the COM flag to a value representing the result of determination. Then, for example, in response to the COM flag being set to the fourth value "off line", the terminal program 65 may skip S63 and start the first timer. According to such a configuration, the latest status information can be acquired quickly at a timing when the communication between the MFP 10 and the information processing terminal 50 is restored.

In the above description, in the MFP 10 and the information processing terminal 50, controllers realize various processes as the programs stored in the memories 32 and 62 are executed by the CPU's 31 and 61, respectively. It is noted, however, the configuration of the controllers need not be limited to those described above. For example, a part of or all of respective controllers may be realized by hardware such as an integrated circuit.

The disclosures are realized by the MFP 10 and the information processing terminal 50. It is noted that the disclosure can also be realized by programs causing the MFP 10 and the information processing terminal 50, respectively. Such programs may be distributed as stored in a non-transitory recording medium. The non-transitory recording medium may include a CD-ROM, a DVD-ROM. Further, the non-transitory recording medium may include a memory implemented in a sever which can be connected to the MFP 10 and/or the information processing terminal 50 through a communication network 101. The programs stored in the memory of the server may be delivered through the communication network (e.g., the Internet) as information or signals representing the programs.

What is claimed is:

1. A non-transitory computer-readable recording medium storing computer-readable instructions for an information processing terminal having a communication interface and a controller,
the computer-readable instructions, when executed by the controller, cause the information processing terminal to repeatedly, at every particular time interval, perform:
an information acquiring process of acquiring, from an image processing apparatus having image processing hardware configured to process image data, status information representing a status of the image processing apparatus, wherein the status information includes at least one of first information and second information, the first information being set to a first value when the image processing hardware is in an active state where an electrical power is supplied to the image processing hardware, the first information being set to a second value when the image processing hardware is in a sleeping state where no electrical power is supplied to the image processing hardware, the second information being obtainable when the image processing is in the active state, the second information not being obtainable when the image processing is in the sleeping state,
wherein the instruction further causes the information processing terminal to perform, in the information acquiring process:
a first requesting process of transmitting, through the communication interface, first request information requesting the image processing apparatus to transmit the first information;
a first receiving process of receiving the first information, as a response to the first request information, from the image processing apparatus through the communication interface;
a first determining process of determining whether a set value of the first information received in the first receiving process is the first value or the second value;
in response to determination, in the first determining process, that first information is set to the first value, the instructions further cause the information processing terminal to perform:
a second requesting process of transmitting, through the communication interface, second request information requesting the image processing apparatus to transmit the second information; and
a second receiving process of receiving the second information, as a response to the second request information, from the image processing apparatus through the communication interface; and
in response to determination, in the first determining process, that the first information is set to the second value, the instructions cause the information processing terminal to:
perform none of the second requesting process and the second receiving process; and
repeatedly perform the first requesting process, the first receiving process and the first determining process.

2. The non-transitory computer-readable recording medium according to claim 1,
wherein the information processing terminal has a display, and
wherein the instructions cause, when executed by the controller, the information processing terminal to perform a displaying process of displaying the status represented by the status information acquired in the information acquiring process on the display.

3. The non-transitory computer-readable recording medium according to claim 2,
wherein the information processing terminal includes an input interface; and
wherein the instructions cause, when executed by the controller, the information processing terminal to:
display, in the displaying process, an update object corresponding to an instruction to update the status information; and
in response to receipt of a user operation to designate the update object through the input interface, perform the information acquiring process of acquiring both the first information and the second information from the image processing apparatus without performing the first determining process.

4. The non-transitory computer-readable recording medium according to claim 1,
wherein the instructions cause, when executed by the controller, the information processing terminal to perform:
in response to every elapse of a first time period, the first determining process in the information acquiring process; and
in response to every elapse of a second time period, acquire both the first information and the second information from the image processing apparatus, without performing the first determining process, in the information acquiring process, the second time period being longer than the first time period.

5. The non-transitory computer-readable recording medium according to claim 4, wherein the instructions cause, when executed by the controller, the information processing terminal to perform:
a second determining process of determining whether a communication with the image processing apparatus is available in the information acquiring process; and
in response to elapse of the first time period since previous execution of the information acquiring process and in response to determination by the second determining process during the previous information acquiring process, the information acquiring process of acquiring both the first information and the second information from the image processing apparatus, without performing the first determining process.

6. The non-transitory computer-readable recording medium according to claim 1,
wherein the first information indicates whether the image processing apparatus is in the active state of the sleeping state; and
wherein the second information indicates status of consumables which the image processing hardware uses to process image data.

7. The non-transitory computer-readable recording medium according to claim 1,
wherein the first information is retrievable from a memory provided to the image processing apparatus regardless whether the image processing apparatus is in the active state or the sleeping state; and
wherein the second information is retrievable from the memory provided to the image processing apparatus only when the image processing apparatus is in the active state.

8. The non-transitory computer-readable recording medium according to claim 1,
wherein the image processing apparatus is provided with a first controller and a second controller;
wherein the first information is information acquired by the first controller to which electrical power is supplied regardless whether the image processing apparatus is in the active state or the sleeping state; and
wherein the second information is information acquired by the second controller to which the electrical power is supplied only when the image processing apparatus is in the active state.

9. A non-transitory computer-readable recording medium storing computer-readable instructions for an information processing terminal having a communication interface, a display and a controller,
wherein the computer-readable instructions, when executed by the controller, cause the information processing terminal to repeatedly, at every particular time interval, perform:
an information acquiring process of acquiring, from an image processing apparatus having image processing hardware configured to process image data, status information representing a status of the image processing apparatus,
wherein the status information includes at least one of first information and second information, the first information being set to a first value when the image processing hardware is in an active state where an electrical power is supplied to the image processing hardware, the first information being set to a second value when the image processing hardware is in a sleeping state where no electrical power is supplied to the image processing hardware, the second information being obtainable when the image processing is in the active state, the second information not being obtainable when the image processing is in the sleeping state,
wherein the instruction further causes the information processing terminal to perform, in the information acquiring process:
a first determining process of determining whether a set value of the first information is the first value or the second value;
in response to determination in the first determining process that the set value is the first value, perform:
an all information requesting process of transmitting, through the communication interface, all information request information requesting to transmit both the first information and the second information, to the image processing apparatus; and
an all information receiving process of receiving, through the communication interface, the first information and the second information as a response to the all information request information; and
in response to determination in the first determining process that the set value is the second value, perform:
a partial information requesting process of transmitting, through the communication interface, partial information request information requesting to transmit only the first information from among the first information and the second information, to the image processing apparatus; and
a partial information receiving process of receiving, through the communication interface, the first information as a response to the partial information request information; and
repeatedly perform the first determination process upon completion of the all information receiving process or the partial information receiving process.

10. The non-transitory computer-readable recording medium according to claim 9, wherein the instructions cause, when executed by the controller, the information processing terminal to determine, in the first determining process, whether the set value of the first information, which was acquired in the previous information acquiring process, is the first value or the second value.

11. The non-transitory computer-readable recording medium according to claim 9,
wherein the instructions cause, when executed by the controller, the information processing terminal to perform:
the first determining process in the information acquiring process which is executed at every elapse of a first time period; and
acquire both the first information and the second information from the image processing apparatus in the information acquiring process which is executed at every elapse of a second time period which is longer than the first time period, without performing the first determining process.

12. The non-transitory computer-readable recording medium according to claim 9,
wherein the instructions cause, when executed by the controller, the information processing terminal to perform:
a second determining process of determining whether a communication with the image processing apparatus is available in the information acquiring process; and in response to elapse of the first time period since previous execution of the information acquiring process and in response to determination by the second determining process during the previous information acquiring process, the information acquiring process of acquiring both the first information and the second information from the image processing apparatus, without performing the first determining process.

13. The non-transitory computer-readable recording medium according to claim 9,
wherein the information processing terminal includes an input interface; and
wherein the instructions cause, when executed by the controller, the information processing terminal to:
display the status represented by the status information acquired in the information acquiring process on the display and an update object corresponding to an instruction to update the status information; and
in response to receipt of a user operation to designate the update object through the input interface, perform the information acquiring process of acquiring both the first information and the second information from the image processing apparatus without performing the first determining process.

14. The non-transitory computer-readable recording medium according to claim 9,
wherein the first information indicates whether the image processing apparatus is in the active state of the sleeping state; and
wherein the second information indicates status of consumables which the image processing hardware uses to process image data.

15. The non-transitory computer-readable recording medium according to claim 9,
wherein the first information is retrievable from a memory provided to the image processing apparatus regardless whether the image processing apparatus is in the active state or the sleeping state; and
wherein the second information is retrievable from the memory provided to the image processing apparatus only when the image processing apparatus is in the active state.

16. The non-transitory computer-readable recording medium according to claim 9,
wherein the image processing apparatus is provided with a first controller and a second controller;
wherein the first information is information acquired by the first controller to which electrical power is supplied regardless whether the image processing apparatus is in the active state or the sleeping state; and
wherein the second information is information acquired by the second controller to which the electrical power is supplied only when the image processing apparatus is in the active state.

17. A non-transitory computer-readable recording medium storing computer-readable instructions for an information processing terminal having a communication interface, a display and a controller,
wherein the computer-readable instructions, when executed by the controller, cause the information processing terminal to repeatedly, at every particular time interval, perform an information acquiring process of acquiring, from an image processing apparatus having image processing hardware configured to process image data, status information representing a status of the image processing apparatus,
wherein the status information includes first information and second information, the first information being set to a first value when the image processing hardware is in an active state where an electrical power is supplied to the image processing hardware, the first information being set to a second value when the image processing hardware is in a sleeping state where no electrical power is supplied to the image processing hardware, the second information being obtainable when the image processing is in the active state, the second information not being obtainable when the image processing is in the sleeping state,
wherein the instruction further causes the information processing terminal to perform, in the information acquiring process:
a requesting process of transmitting status request information to the image processing apparatus through the communication interface;
a receiving process of receiving the status information, as a response to the status request information, from the image processing apparatus through the communication interface;
a determining process of determining whether a set value of the first information received in the receiving process is the first value or the second value;
in response to determination, in the determining process, that the set value is the first value, determining a first time period and performing a next information acquiring process at a timing when the first time period has elapsed since a previous information acquiring process was executed; and
in response to determination, in the determining process, that the set value is the second value, determining a second time period and performing a next information acquiring process at a timing when the second time period, which is longer than the first time period, has elapsed since the previous information acquiring process was executed.

* * * * *